Sept. 2, 1958        R. H. HART        2,850,209
PISTON TYPE METERING VALVE
Filed March 29, 1954
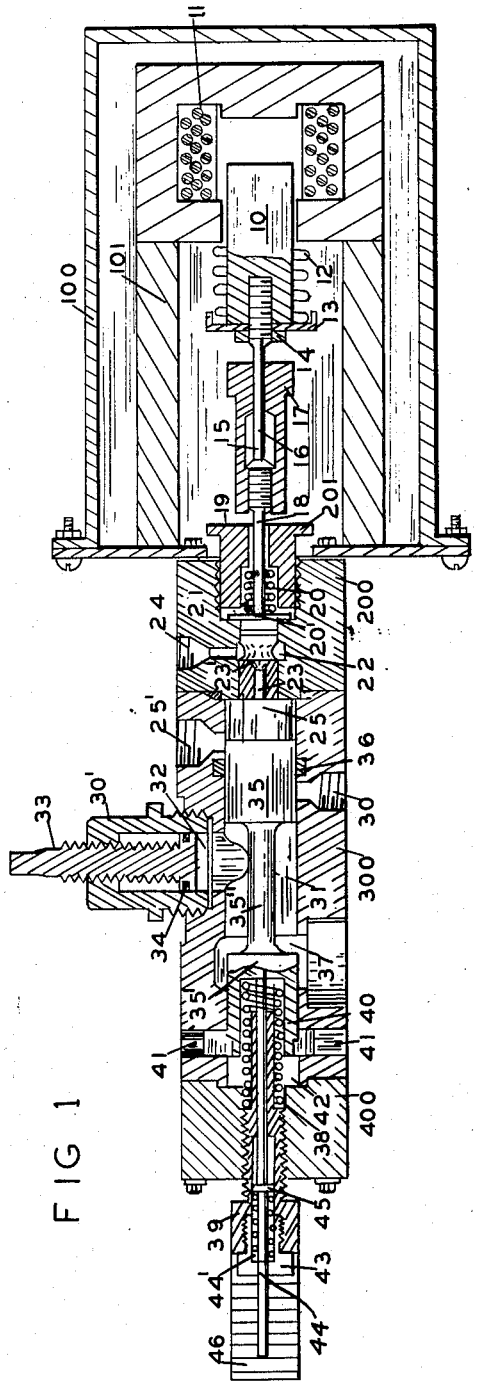
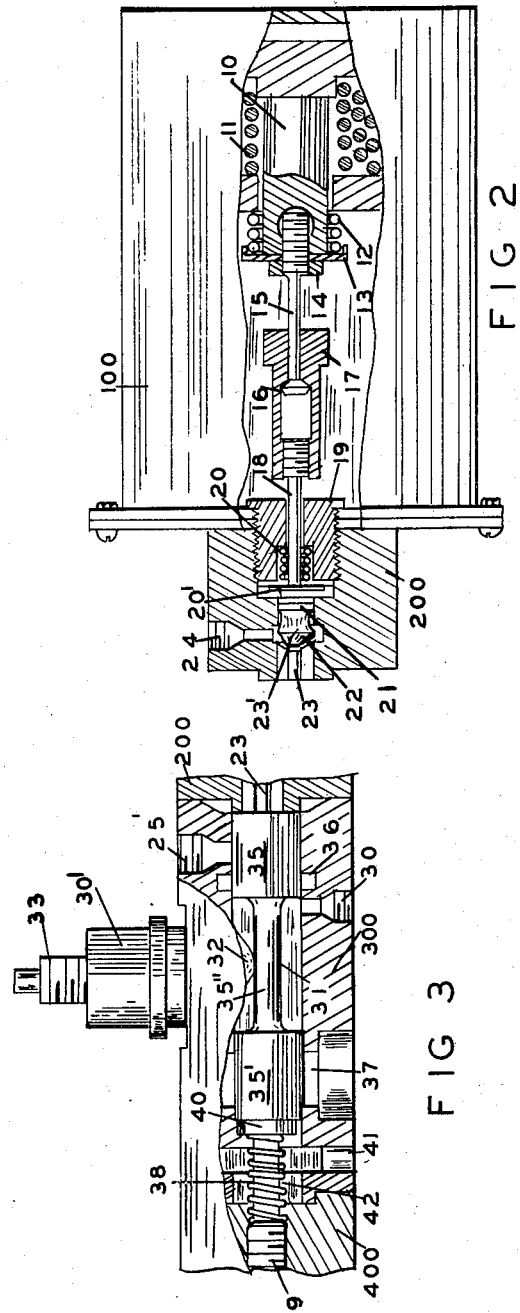
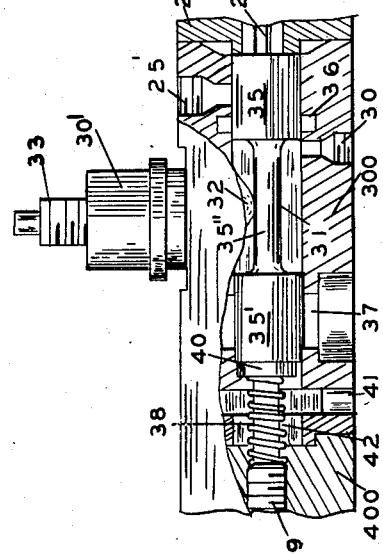
INVENTOR.
ROBERT H. HART
BY
ATTORNEY Patented Sept. 2, 1958

2,850,209
PISTON TYPE METERING VALVE

Robert H. Hart, Atlanta, Ga., assignor to Georgia Tech Research Institute, Atlanta, Ga., a corporation of Georgia Application March 29, 1954, Serial No. 419,177

13 Claims. (Cl. 222—3)

My invention relates to a quick opening valve, and more particularly to a quick opening valve for discharging measured quantities of compressed gas, such as a valve which will release as quickly as possible a measured amount of gas from its compressed state without provision for any intermediate stage of pressure and volume.

An object of my invention is to provide a quick opening valve with an opening time of from one-fourth millisecond to one millisecond.

A further object of my invention is to provide a quick opening metering valve that will quickly return to its "ready" position for repeated operation.

A further object of my invention is to provide a quick opening valve that may be operated from a remote position.

A further object of my invention is to provide a reciprocating valve that will release variable measured volumes of gas from a constant pressure gas source.

A still further object of my invention is to provide a quick operating valve with a liquid cushion to arrest the valve at the end of its opening movement.

Other and further objects and advantages of my invention will be apparent from the following description taken in conjunction with the accompanying drawing in which like characters of reference designate corresponding parts throughout the several views, and wherein:

Fig. 1 is a longitudinal cross-sectional view of my invention showing the valve in an intermediate open position.

Fig. 2 is a fragmentary enlarged cross-sectional view of the valve actuating solenoid and poppet valve, the poppet valve being in open position.

Fig. 3 is a fragmentary enlarged view showing the valve in closed or normal "ready" position.

While the construction of the valve of my invention is not limited to "quick-opening" valves, it is especially desirable where accuracy and speed of operation are required. The term "quick-opening" is a relative term and in the instant case it may be defined as meaning an opening time of less than ten milliseconds. In fact, in the exemplification illustrated, the opening time was found by test to be adjustable from one-fourth of a millisecond to one millisecond for a valve metering from 1.8 to 3.0 inches of gas per stroke of the valve.

According to my invention, a balanced piston-type valve is accelerated prior to the point of opening, thus allowing the opening time of the valve to be controlled by the velocity of the piston at the point of opening. The piston is driven by compressed gas which is admitted to the head end of the piston by a poppet-type pilot valve. The pilot valve is triggered by a solenoid, or other suitable means either mechanical or hydraulic, and the driving gas pressure controls the velocity of the piston at the point of opening and thus controls the opening rate of the valve.

From Fig. 1, it will be seen that the device may be broken down for purposes of description into four portions. Housing 100 encloses the solenoid and pilot valve triggering means; portion 200 houses the poppet or poppet valve and high pressure driving air connection; portion 300 houses the balanced-piston main metering valve itself and includes the driving air relief port, gas inlet, gas outlet and valve cushioning and return means; and portion 400 houses adjusting means for the main valve return spring and valve position indicator.

Referring now to Fig. 3, a main dumbbell-shaped balanced valve having piston ends 35, 35' is shown in the normal position just prior to actuation with the driving end of this valve against the stop formed by element 200. Gas under pressure has been introduced through opening 30 into chamber 31 which surrounds the central reduced portion 35" of the main valve. The volume of gas to be discharged upon actuation of the valve is limited to the volume of spaces 31, 32. The valve is normally held in this normal closed position by return spring 38.

Upon sudden admission of high pressure driving air through opening 23 into valve chamber 25 against piston head 35, the main valve will move to the left through a position shown in Fig. 1. It will be noted in Fig. 1 that the gas inlet port 30 is closed, and gas discharge port 37 is open so that the gas enclosed in spaces 31, 32 may expand through port 37.

Under the force of the high pressure driving air the main valve is accelerated very rapidly to the left in Fig. 1. In order to stop the motion of the main valve to the left and to cushion the impact, a pocket 42 is provided which entraps liquid to provide such a cushion, as will be explained later in more detail.

As seen in Fig. 1, as the valve 35 moves to the left, the high pressure air release port 25' is opened whereby the force moving the valve to the left is removed from the driving end of the valve, since the high pressure poppet valve 22 is now closed.

As soon as motion of the main valve has been arrested by cushion 42, valve return spring 38 which engages the end 35' will return the valve to the position shown in Fig. 3 preparing the valve for its next cycle of operation.

Describing the device in more detail, the valve is actuated by an electric solenoid 11 which, when energized, draws movable armature 10 to the right in Fig. 1, to the position shown in Fig. 2. Armature 10 is normally urged to the left in the drawings by spring 12 operating against plate 13 secured to the armature by lock nut 14. Also mounted on the armature is a bar or link 15 with an enlarged head 16 which cooperates with a cylindrical element 17 to form a lost motion device such that armature 10 may move substantially its full stroke before head 16 engages the restriction in element 17. Armature 10, therefore, imparts a heavy impact to element 17 by means of head 16, to move element 17 to the right in the drawings.

Element 17 is rigidly secured to valve stem 18 of high pressure air poppet valve 22. Valve stem 18 passes loosely through guide 19. A valve return spring 20 presses against guide 19 and against presser plate 20' to urge poppet valve 22 to the left in the drawings into normal closed position, as seen in Fig. 1.

Valve 22 is surrounded by a packing 21 to retain the high pressure air in the poppet valve chamber. Valve 22 is supplied with air from a high pressure air source (not shown) through a connection 24. Valve 22 seats against seat 23' to close passage 23 through which high pressure air is admitted to actuate the main metering valve upon actuation of the solenoid means 10—11.

Upon opening of poppet valve 22, as seen in Fig. 2, high pressure air is introduced through passage 23 to valve chamber 25 in housing 300. As force is exerted by the high pressure air on valve head 35, introduced by the quickly opened poppet valve 22, the main valve will be driven to the left, as seen in Fig. 1. It will be noted in Fig. 1 that valve poppet 22 is again closed as it is not desired to continue air pressure against valve head 35 beyond the necessary amount to actuate the main valve.

As seen in Fig. 1, a high pressure air relief port 25' is uncovered before the main valve has completed its stroke. The remainder of the stroke is performed under the momentum of the valve. Return of the main valve after completion of the stroke is not prevented by an air cushion in space 25 as the valve 35 fits somewhat loosely, permitting escape of the spent air out of vent 25'.

My main valve comprises two cylindrical end portions 35, 35' connected and held in spaced relationship by a central portion 35" of reduced diameter. As indicated above, the diameter of end 35 is slightly smaller than the cylindrical chamber 25, but a packing 36 is provided to seal the valve against admixture of the gas to be metered with the high pressure operating air.

As seen in Fig. 3, when the main valve is in normal or closed position, the gas inlet port 30 is exposed to the cavity 31 about the reduced portion 35" of the valve. This cavity is limited at one end by cylindrical end portion 35 and at the other end by cylindrical end portion 35'. An adjustable volume chamber 32 communicates with cavity 31. This adjustable volume chamber is formed in a cylindrical element 30' in which there is an adjustable piston 33 with a sealing packing 34. It will be understood that upon movement of piston 33 upwardly, Figs. 1 and 3, the volume of the combined spaces 31, 32 is enlarged and when the piston is moved downwardly the volume is reduced. In an embodiment of the valve of this invention that was built and tested, the volume could be varied from 1.8 to 3.0 cubic inches.

From Fig. 1, it will be noted that as the main valve moves from normal or closed position to open position the gas inlet port 30 is first covered by end portion 35 of the main valve. Almost immediately thereafter annular discharge port 37 is uncovered by end 35'. An annular port is used in the present exemplification as it gives the maximum increase in area of the port with the least change in position of the valve element 35'. It will be seen therefore that the venting of the compressed gas in spaces 31, 32 is accomplished practically instantaneously to the discharge port 37. In an exemplification under test, the valve opening time was found to be adjustable, by adjusting the pressure of the high pressure air, from one-fourth millisecond to 1.0 millisecond.

A plurality of vents 41 are provided in the valve body 300 at the end portion 35' of the main metering valve. These vents are provided with liquid from a source not indicated. As the valve 35' moves from normal or closed position of Fig. 3 to position shown in Fig. 1, it will be seen that liquid will be expelled through ports 41. As the valve end 35' continues to move to the left in Fig. 1, liquid in space 42 will be entrapped. Were the valve end 35' not relieved, as at 40, the pressure of the entrapped liquid would build up so rapidly as to act almost as though this liquid were solid. To give a cushioning effect, the valve end 35' is relieved at 40 so that, as the valve end 35' enters space 42 the liquid will be discharged at a rapidly diminishing rate from said space until the kinetic energy of the high velocity main valve is dissipated without damage to the mechanism.

The valve return spring 38 also tends to cushion the motion of the main valve. Spring 38 is supported and guided by an adjustable element 39 mounted on housing 400 coaxially of the main valve body. There is mounted also in element 39 a valve position indicating rod 44 which is merely a rod slideable in element 39. This rod is spring pressed against the end of the valve by a spring 44' held in place by means of screw cap 43. The position of the main valve position indicating rod 44 may be compared against the scale 46 in order to determine the position of the main valve.

To summarize, in the rest position, the piston valve head 35 is held against the pilot valve end of the valve body 300 by the piston return spring 38. In this position, the gas inlet port 30 is open and the discharge port 37 is closed. The gas to be released fills the gas reservoir 32 and the annular space 31 around the reduced central portion 35" of the piston valve. The pilot valve 22 admits driving gas to the head end 25 of the valve cylinder, which gas exerts a force on the piston head 35 and causes the main piston valve to be accelerated. As the piston moves it first closes the charging port 30 and isolates the gas charge. The moving piston valve then uncovers the discharge port 37 and releases the gas charge through the outlet. At the same time as the discharge port 37 is opened, the driving gas relief port 25' is opened allowing the driving gas to escape. When the discharge port 37 has been fully opened, the main piston valve is stopped by a liquid cushion at 42 which causes the main piston valve to be decelerated as it moves into the liquid cushion. The escape path for the liquid of the cushion is the annular space 40 between the piston 35' and the cylinder wall in valve body 300. When the main piston valve has stopped, the valve's stroke is complete, and the piston return spring 38 then returns the main piston valve to the original position.

Further, the operation of the pilot valve assembly is as follows: When the solenoid 11 is excited with a current pulse, it exerts a force on the armature 10 which is then accelerated until it and the attached linkage 15 strikes the linkage 17 attached to the poppet valve 22. Then the armature 10 bounces clear of the linkage 17 and allows the poppet return spring 20 to accelerate only the poppet 22 and linkage 17 in closing the poppet 22 on seat 23'. Subsequent travel or oscillations of the armature 10 are naturally of a lower magnitude than the first travel and whether or not current is still applied to solenoid 11 there is no re-triggering of poppet valve 22; however, when the current pulse is over, the armature return spring 12 returns the armature 10 to its rest position. The kinetic energy of the armature 10 is absorbed by the linkages 15, 17, 18 and the poppet return spring 20. The poppet 22 is opened in the process of absorbing the kinetic energy of the armature 10 and admits driving gas to drive the piston 35 through its stroke, the driving gas being admitted to the pilot valve through the driving gas inlet 24.

Of course the triggering of the pilot valve may be accomplished by hydraulic or mechanical means instead of by a solenoid, as described above; and the amount of gas released may be varied by varying the volume of the gas reservoir 32 with the movable plug 33 or by varying the gas supplied pressure. It will be understood that the control of the opening rate of the valve is the pressure of the driving gas supplied. Possible uses of my device include injection of gaseous additives, pilot for rapid response pneumatic systems and agitation of liquids.

It will be seen from the foregoing description that I have provided a valve which may be operated extremely rapidly and which will accurately meter variable quantities of gas under pressure without permitting the gas to expand prior to the time of release.

It will be obvious to those skilled in the art that various modifications, changes and adaptations can be made in the quick operating metering valve of my invention without departing from the scope of my invention as defined in the following claims.

I claim:

1. A quick opening valve comprising a body having a cylindrical bore, a valve element slideable in said bore comprising two cylindrical portions connected together by a portion of reduced diameter to provide a metering space between said cylindrical portions, stop means at one end of said cylindrical bore, a gas inlet port spaced from said stop means such a distance that said port is exposed to said metering space when said valve element is in normal position against said stop whereby gas may be introduced to said metering space, a gas discharge port covered by said valve element when said valve element is against said stop, said discharge port being spaced from said gas inlet port a distance such that it will be uncovered only after said gas inlet port has been covered by the cylindrical portion of said valve element closest to said stop means as said valve element slides from normal closed position to open position, arresting means to arrest movement of said valve element, and return means pressing against the cylindrical portion of the valve element remote from said stop means to return said valve element to its normal closed position against said stop means.

2. The device of claim 1 in which a cylindrical chamber communicates with said bore in a position to be at all times in communication with the portion of said bore surrounding the portion of reduced diameter of the valve element, and a piston adjustably mounted in said cylindrical chamber to vary the volumetric capacity thereof.

3. The device of claim 2 in which an actuating air port is provided in the stop means, said port being provided with a remote control valve, and an actuating air relief port located in the wall of said cylindrical bore a distance of approximately half the distance of travel of the valve element between the stop means and the arresting means.

4. The device of claim 3 in which the remote control valve is of the poppet type seating in the direction of flow of the actuating air.

5. The device of claim 4 in which the remote control valve is operably connected through a lost motion device to an actuating means.

6. The device of claim 5 in which the arresting means includes a closure on the end of said bore remote from said stop, a space in which liquid interposed between the valve element and the closed end of the bore is entrapped, vents spaced from the closed end of the bore for passage of liquid to and from said bore, said valve element being of a reduced diameter for a distance less than the distance from said vents to the closed end of said bore, whereby as the portion of the valve element of reduced diameter enters said space the rate of passage of liquid from said space will be controlled.

7. Valve mechanism comprising a solenoid, an armature normally positioned at one end of said solenoid to be drawn into said solenoid upon activation thereof, a lost motion linkage connecting said armature to a poppet valve for opening said valve, a housing, a passage in said housing opened by operation of said poppet valve to admit high pressure air for exerting force against the end of a cylindrical valve body operating in an elongated bore in said housing, said cylindrical valve body including a first cylindrical portion against which the high pressure air impinges, a portion of reduced diameter in said valve body to provide an annular chamber, and a second cylindrical portion at the opposite end of said portion of reduced diameter, a high pressure air relief port in the wall of the bore a distance approximately half the length of said first cylindrical portion, a sealing gasket in the wall of said bore adjacent said relief port, a gas inlet port adjacent to said sealing gasket on the side of said gasket away from the air relief port, said gas inlet port being spaced from the end of said bore a distance equal to the length of said first cylindrical portion, a gas discharge port spaced from said gas inlet port a distance such that the inlet port and the discharge port can never be exposed at the same time to the annular chamber, a valve return spring resiliently pressing against the end of said second cylindrical portion, hydraulic arresting means actuated by motion of said cylindrical valve body under the influence of said high pressure air, and valve position indicating means mounted coaxially of said valve return spring.

8. Valve mechanism including a valve body having an internal bore, a valve element reciprocably mounted in said bore, said valve element being provided with opposed ends and having an intermediate portion of reduced cross-section to provide a metering space between said ends, means for urging said valve element to a position of rest in said body, said body being provided with a port for admission of operating fluid under pressure to move said valve element from said position of rest to a position for discharge, a control valve movably mounted to control the flow of fluid through said port, means resiliently urging said control valve to close said port, operating means for opening said control valve, and lost motion means interconnecting said operating means and said control valve being operable to release said control valve from said operating means for closure, said valve body being provided with main fluid inlet means and operating fluid outlet means and main fluid outlet means, said operating fluid outlet means and said annular fluid outlet means being closed by said valve element when said valve element is in said position of rest and said main fluid inlet means being then in communication with said metering space, the construction and arrangement of said main fluid inlet means and said operating fluid outlet means and said main fluid outlet means being such that upon movement of said valve element from said position of rest toward said discharge position said valve element first closes said main fluid inlet means then opens said operating fluid outlet means and puts said main fluid outlet means in communication with said metering space after acceleration of said valve element and after closure of said fluid inlet means.

9. Valve mechanism including a valve body having an internal bore, a valve element reciprocably mounted in said bore, said valve element being provided with opposed ends and having an intermediate portion of reduced cross-section to provide a metering space between said ends, a chamber communicating with said bore surrounding said intermediate portion, means associated with said chamber to vary the volumetric capacity thereof, means for urging said valve element to a position of rest in said body, said body being provided with a port for admission of operating fluid under pressure to act against one of said ends to move said valve element from said position of rest to a position for discharge, a control valve movably mounted to control the flow of fluid through said port, means resiliently urging said control valve against said port to close the same, operating means movable to open said control valve, and lost motion means interconnecting said operating means and said control valve to jerk said control valve open and operable to release said control valve from said operating means for closure, said valve body being provided with main fluid inlet means and operating fluid outlet means and main fluid outlet means, said operating fluid outlet means and said main fluid outlet means being closed by said one of said ends when said valve element is in said position of rest and said main fluid inlet means being then in communication with said metering space, the construction and arrangement of said main fluid inlet means and said operating fluid outlet means and said main fluid outlet means being such that upon movement of said valve element from said position of rest toward said discharge position said one of said ends first closes said main fluid inlet means then opens said operating fluid outlet means and the other of said ends puts said main fluid outlet means in communication with said metering space after acceleration of said valve element and after closure of said fluid inlet means.

10. Valve mechanism including a valve body having an internal bore, a valve element reciprocably mounted in said bore, said valve element being provided with opposed ends and having an intermediate portion of reduced cross-section to provide a metering space between said ends, means for urging said valve element to a position of rest in said body, said body being provided with a port for admission of operating fluid under pressure to act against one of said ends to move said valve element from said position of rest to a position for discharge, a control valve movably mounted to control the flow of fluid through said port, means resiliently urging said control valve against said port to close the same, operating means movable to open said control valve, and lost motion means interconnecting said operating means and said control valve engageable intermediate the limit of its stroke to jerk said control valve open and operable to release said control valve from said operating means for closure, said valve body being provided with main fluid inlet means and operating fluid outlet means and main fluid outlet means, said operating fluid outlet means and said main fluid outlet means being closed by said one of said ends when said valve element is in said position of rest and said main fluid inlet means being then in communication with said metering space, the construction and arrangement of said main fluid inlet means and said operating fluid outlet means and said main fluid outlet means being such that upon movement of said valve element from said position of rest toward said discharge position said one of said ends first closes said main fluid inlet means then opens said operating fluid outlet means and the other of said ends puts said main fluid outlet means in communication with said metering space after acceleration of said valve element and after closure of said main fluid inlet means.

11. Valve mechanism including a valve body having an internal bore, a valve element reciprocably mounted in said bore, said valve element being provided with opposed ends and having an intermediate portion of reduced cross-section to provide a metering space between said ends, means for urging said valve element to a position of rest in said body, said body being provided with a port for admission of operating fluid under pressure to act against one of said ends to move said valve element from said position of rest to a position for discharge, a control valve movably mounted to control the flow of fluid through said port, means resiliently urging said control valve against said port to close the same, operating means movable to open said control valve, and lost motion means interconnecting said operating means and said control valve engageable intermediate the limit of its stroke to jerk said control valve open and operable to release said control valve from said operating means for closure free and independent of said operating means, said valve body being provided with fluid inlet means and operating fluid outlet means and annular fluid outlet means, said operating fluid outlet means and said annular fluid outlet means being closed by said one of said ends when said valve element is in said position of rest and said fluid inlet means being then in communication with said metering space, the construction and arrangement of said fluid inlet means and said operating fluid outlet means and said annular fluid outlet means being such that upon movement of said valve element from said position of rest toward said discharge position said one of said ends first closes said fluid inlet means and then opens said operating fluid outlet means and the other of said ends puts said annular fluid outlet means in communication with said metering space after acceleration of said valve element and after closure of said fluid inlet means.

12. Valve mechanism including a valve body having an internal bore, a valve element reciprocably mounted in said bore, said valve element being provided with opposed ends and having an intermediate portion of reduced cross-section to provide a metering space between said ends, a chamber communicating with said bore surrounding said intermediate portion, means adjustably mounted in said chamber to vary the volumetric capacity thereof, means for urging said valve element to a position of rest in said body, said body being provided with a port for admission of operating fluid under pressure to act against one of said ends to move said valve element from said position of rest to a position for discharge, a control valve movably mounted to control the flow of fluid through said port, means resiliently urging said control valve against said port to close the same, operating means movable to open said control valve, lost motion means interconnecting said operating means and said control valve engageable intermediate the limit of its stroke to jerk said control valve open and operable to release said control valve from said operating means for closure free and independent of said operating means, said valve body being provided with fluid inlet means and operating fluid outlet means and annular fluid outlet means, said operating fluid outlet means and said annular fluid outlet means being closed by said one of said ends when said valve element is in said position of rest and said fluid inlet means being then in communication with said metering space, the construction and arrangement of said fluid inlet means and said operating fluid outlet means and said annular fluid outlet means being such that upon movement of said valve element from said position of rest toward said discharge position said one of said ends first closes said fluid inlet means then opens said operating fluid outlet means and the other of said ends puts said annular fluid outlet means in communication with said metering space after acceleration of said valve element and after closure of said fluid inlet means, and fluid cooperating with the said other of said ends to dampen the movement of said valve element to said discharge position.

13. Valve mechanism including a valve body having an internal bore, a valve element reciprocably mounted in said bore, said valve element being provided with opposed piston type ends and having an intermediate portion of reduced cross-section to provide a metering space between said ends, a chamber communicating with said bore surrounding said intermediate portion, a piston adjustably mounted in said chamber to vary the volumetric capacity thereof, means for urging said valve element to a position of rest in said body, said body being provided with a port for admission of operating fluid under pressure to act against one of said piston type ends to move said valve element from said position of rest to a position for discharge, a control valve movably mounted to control the flow of fluid through said port, means resiliently urging said control valve against said port to close the same, operating means movable to open said control valve, lost motion means interconnecting said operating means and said control valve engageable intermediate the limit of its stroke to jerk said control valve open and operable to release said control valve from said operating means for closure free and independent of said operating means, said valve body being provided with fluid inlet means and operating fluid outlet means and annular fluid outlet means, said operating fluid outlet means and said annular fluid outlet means being closed by said one of said piston type ends when said valve element is in said position of rest and said fluid inlet means being then in communication with said metering space, the construction and arrangement of said fluid inlet means and said operating fluid outlet means and said annular fluid outlet means being such that upon movement of said valve element from said position of rest toward said discharge position said one of said piston type ends first closes said fluid inlet means then opens said operating fluid outlet means and the other of said piston type ends puts said annular fluid outlet means in communication with said metering space after acceleration of said valve element and after closure of said fluid inlet means, fluid cooperating with the said other of said piston type ends to dampen the movement of said valve element to said discharge position, and means operably connected to indicate the position of said valve element in said valve body.

References Cited in the file of this patent

UNITED STATES PATENTS

| | | |
|---|---|---|
| 1,742,208 | Hawxhurst | Jan. 7, 1930 |
| 2,074,143 | Davis | Mar. 16, 1937 |
| 2,459,010 | Williams | Jan. 11, 1949 |
| 2,472,102 | Fryer | June 7, 1949 |
| 2,478,260 | Fioretti | Aug. 9, 1949 |